United States Patent [19]
Trimbath

[11] Patent Number: 5,564,652
[45] Date of Patent: Oct. 15, 1996

[54] BODY SPOILER FOR YAW CONTROL OF A SUPERSONIC AIRPLANE

[75] Inventor: Thomas E. Trimbath, Bellevue, Wash.

[73] Assignee: The Boeing Compay, Seattle, Wash.

[21] Appl. No.: 367,544

[22] Filed: Jan. 3, 1995

[51] Int. Cl.$^6$ ..................................................... B64C 5/00
[52] U.S. Cl. ......................... 244/75 R; 244/46; 244/3.27
[58] Field of Search .................................. 244/75 R, 46, 244/3.27, 3.24, 3.29, 213, 76 A, 87, 90 A

[56] References Cited

U.S. PATENT DOCUMENTS

| | | | |
|---|---|---|---|
| 2,496,083 | 1/1950 | Browning | 244/75 R |
| 2,924,400 | 2/1960 | Ruget | 244/46 |
| 3,596,852 | 8/1971 | Wakefield | 244/53.3 |
| 3,848,831 | 11/1974 | Geary | 244/45 R |
| 4,542,866 | 9/1985 | Caldwell | 244/45 A |
| 4,624,424 | 11/1986 | Pinson | 244/3.21 |
| 4,786,009 | 11/1988 | Rao | 244/75 R |
| 4,917,333 | 4/1990 | Murri | 244/75 R |
| 5,050,819 | 9/1991 | Moskovitz | 244/75 R |
| 5,326,050 | 7/1994 | Zell | 244/75 R |
| 5,366,180 | 11/1994 | Wainfan et al. | 244/46 X |
| 5,398,888 | 3/1995 | Gerhardt | 244/49 X |
| 5,495,999 | 3/1996 | Cymara | 244/46 X |

FOREIGN PATENT DOCUMENTS

| | | | |
|---|---|---|---|
| 0209171 | 1/1987 | European Pat. Off. | 244/75 R |
| 1122838 | 1/1962 | Germany | 244/90 A |

OTHER PUBLICATIONS

W. T. Kehrer, *Design Evolution Of The Boeing 2707–300 Supersonic Transport*, Part II, Design Impact of Handling Qualities Criteria, Flight Control System Concepts, and Aeroelastic Effects on Stability and Control pp. 10–1 through 10–10.

Richard E. Boalbey et al., *High–Angle–Of–Attack Stability And Control Concepts For Supercruise Fighters* pp. 759–784.

*Primary Examiner*—Eric D. Culbreth
*Assistant Examiner*—Christopher Ellis
*Attorney, Agent, or Firm*—W. C. Anderson; R. L. Gullette; B. A. Donahue

[57] ABSTRACT

A body spoiler rotatably mounted within a recess formed within opposite sides of the forebody of a supersonic air vehicle and configured to conform with the fuselage of the vehicle. A sensor positioned close to the inlet of each engine powering the flight of the vehicle measures the pressure of the fluid entering the engine. If an engine on one side of the vehicle malfunctions, the pressure sensor sends a deploy signal to the body spoiler mounted on the same side of the vehicle. An actuator receives the deploy signal and rotates the spoiler through an angle which is dependent upon the speed of the vehicle. When deployed, the spoiler generates a shock wave which in turn produces pressure along the forebody thereby creating a yaw moment to substantially counterbalance the yaw moment generated by the malfunctioning engine. A plurality of spoilers can also be pivotably mounted along and about the periphery of the fuselage and used as an emergency aid in generating other forces and moments along and about the three main axes of the vehicle. In addition to providing yaw moment control, spoilers deployed on the crown or keel of the vehicle at supersonic speeds could be used in dive recovery by generating drag and a nose up pitching moment.

8 Claims, 6 Drawing Sheets

Fig. 11

BODY SPOILER FOR YAW CONTROL OF A SUPERSONIC AIRPLANE

TECHNICAL FIELD

This invention relates to an apparatus for substantially counterbalancing the yaw moment produced directly or indirectly by malfunctioning engines normally powering the flight of a supersonic air vehicle, such as a supersonic airplane or missile. More particularly, this invention relates to at least two body spoilers positioned on opposite sides of the forebody of the supersonic vehicle. Each of the body spoilers may be rapidly deployed under urgent circumstances to generate a yaw moment that assists in counteracting the yaw moment produced as a consequence of the malfunctioning engines.

BACKGROUND OF THE INVENTION

Airplanes capable of supersonic flight, i.e., at speeds equal or greater than a Mach number of 1.0, typically use one or more engines mounted on each side of the airplane. Such airplanes can experience a large yawing moment in the unlikely event that one or more engines on one side of the airplane malfunctions or fails. That undesirable yawing moment may be caused by thrust loss from the failing or failed engine when it is opposed by an operating engine(s) on the other side of the airplane and by the pressures generated by a bow shock formed proximate the failed engine.

For safe flight to continue, flight controls are designed to counter this yawing moment. Such controls typically comprise vertical tails, rudders, and/or spoiler slot deflectors on the wing.

Conventional vertical tails and rudders produce yawing moments by deflecting the rudder surface to generate a side force. Since the generated side force occurs aft of the center of gravity (normally positioned proximate the landing gear), a yawing moment is created. As is well understood in the art, the aircraft designer has long been plagued with the problem of loss of aerodynamic control effectiveness due to structural flexibility. This means that the cantilevered structures, i.e., the vertical tail and rudder, twist under load. As a result of such elastic losses, and depending upon the structural design, such structures may lose nearly three quarters of their effectiveness. Thus, the yawing moment that a vertical tail or rudder can theoretically produce is reduced by three quarters (75%). The cantilever structure supporting the vertical tail assembly may also be cantilevered from the aft pressure bulkhead of the fuselage resulting in a very inefficient structure.

Conventional spoiler slot deflectors generate yawing moments by generating drag and changing the pressures over the wing of the airplane. A spoiler on the top or bottom of the wing and a deflector on the bottom or top of the wing defines an opening through the wing. Spoiler slot deflectors are very effective because they do not experience large elastic losses. On the other hand, these deflectors require a large hole in the wing structure thereby undesirably impacting outboard wing support, trailing edge flap supports and trailing edge flap actuation. Indirectly a spoiler slot deflector adds weight, reduces the effectiveness of outboard wing controls and the overall performance of the wing and airplane.

Flight control surfaces capable of producing various types of aerodynamic forces and moments are well known. For example, see the flaps of Browning, U.S. Pat. No. 2,496,083, issued Jan. 31, 1940; the fuselage flaps of Geary, U.S. Pat. No. 3,848,831, issued Nov. 19, 1974; the canards of Caldwell, et al., U.S. Pat. No. 4,542,866, issued Sep. 24, 1985; the control panels of Pinson, U.S. Pat. No. 4,624,424; the deflecting strakes of Rao, et al, U.S. Pat. No. 4,786,009, issued Nov. 22, 1988, the yaw producing rotatable strakes of U.S. Pat. No. 4,917,333; and the forebody flow controller of Moskovitz, U.S. Pat. No. 5,050,819, issued Sep. 24, 1991.

However, the body spoiler of the present invention can more effectively produce a high percentage of the necessary yawing moment without some of the negative aspects of the typical flight controls mentioned above. In doing so, it can reduce the size and weight of conventional flight controls such as vertical tails, rudders, and/or spoiler slot deflectors on the wing.

SUMMARY OF THE INVENTION

In one embodiment of the present invention, a body spoiler is rotatably mounted within a recess formed within opposite sides of the forebody of a supersonic airplane and is configured to conform with the fuselage of the airplane when in a stowed position. A sensor positioned close to the inlet of each engine powering the flight of the airplane measures the pressure of the fluid entering the engine. If an engine on one side of the airplane malfunctions, the pressure sensor sends a deploy signal to the body spoiler mounted on the same side of the airplane. An actuator receives the deploy signal and rotates the spoiler through a minimum angle. Alternatively, the deploy signal is received by a controller whereby the controller sends a signal to rotate the spoiler through a minimum angle which is dependent upon the speed of the airplane. When deployed, the spoiler generates a detached shock wave which in turn produces pressure along the forebody thereby creating a yaw moment to substantially counterbalance the yaw moment generated by the malfunctioning engine.

A plurality of spoilers can also be pivotably mounted about the periphery of the fuselage and used as an emergency aid in generating other forces and moments along and about the three main axes of the airplane. For example, spoilers deployed on the crown or keel of the airplane at supersonic speeds could be used in dive recovery by generating drag and a nose up pitching moment.

BRIEF DESCRIPTION OF THE DRAWINGS

The foregoing and other features and advantages of the present invention will become more readily appreciated as the same becomes better understood by reference to the following detailed description of an embodiment of the invention and the accompanying drawings wherein like numbers refer to the same or similar parts and wherein.

DETAILED DESCRIPTION OF THE PREFERRED EMBODIMENT

Figures 1, 2:
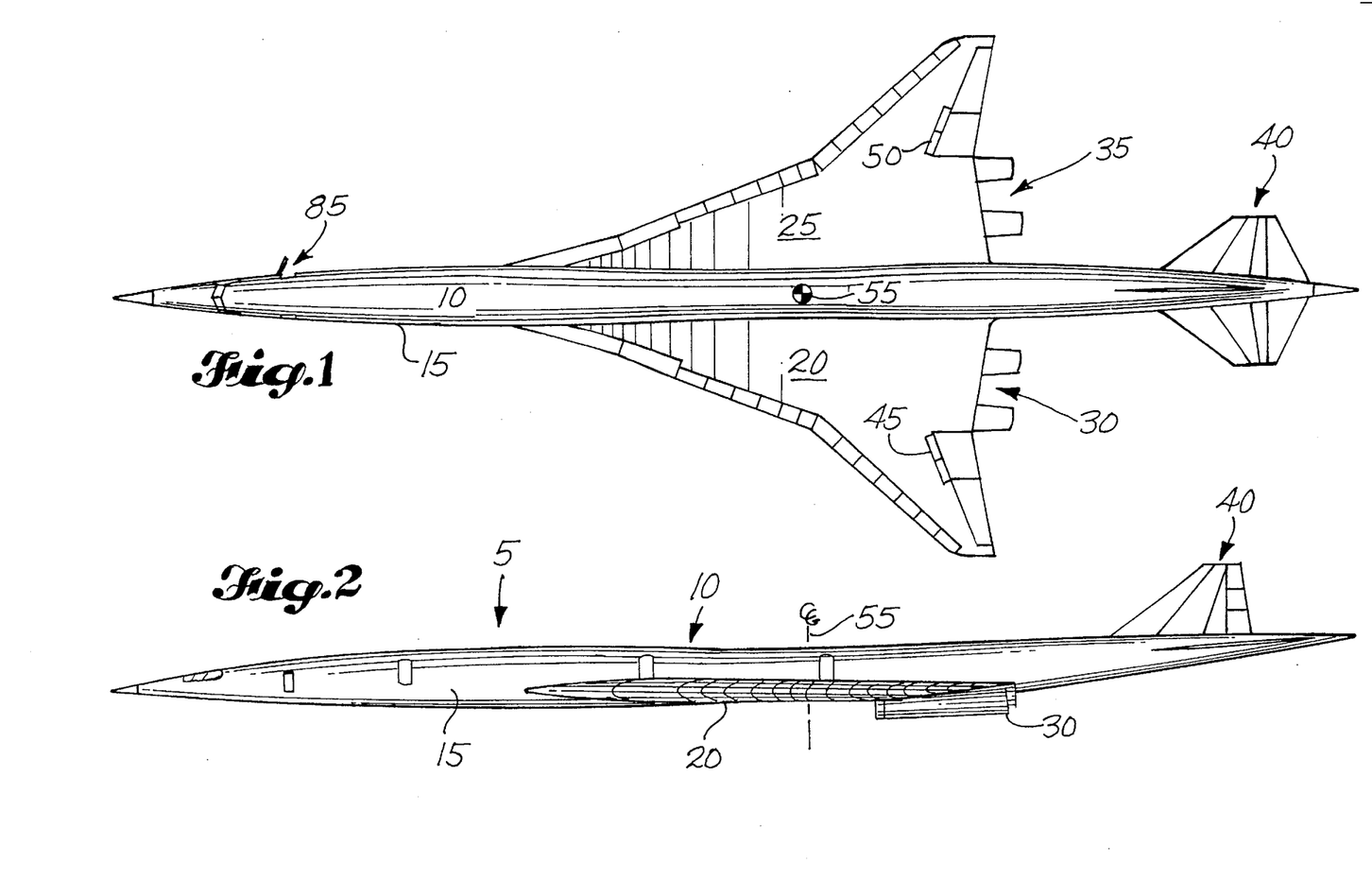
FIG. 1 is plan view of supersonic airplane having the body spoilers of the present invention, one of which is shown in a deployed condition.
FIG. 2 is a view of the port side of the airplane of FIG. 1.

Turning now to FIG. 1, a possible configuration for a supersonic airplane 5 is illustrated. The airplane 5 comprises a fuselage 10 having a forebody 15, port and starboard wings 20 and 25, a pair of engines 30 and 35 mounted under the port and starboard wings 20, 25, respectively, a vertical tail and rudder 40, and spoiler slot deflectors 45 and 50 formed in the wings 20 and 25, respectively. As shown in FIGS. 1 and 2, the center of gravity 55 for the airplane 5 is positioned very close to the airplane landing gear (not shown).

Each of the pair of engines 30 powering the airplane 5 are identical in function and structure with each of the pair of engines 35. The inlet portion 60 of one of the pair of engines 35 is shown very generally in FIG. 3. As illustrated therein, the engine 35 comprises the inlet 60 and a translatable spike 65 centrally positioned within the inlet 60. The spike 65 helps in controlling the flow of fluid into the engine 35.

Figures 3, 9, 10:
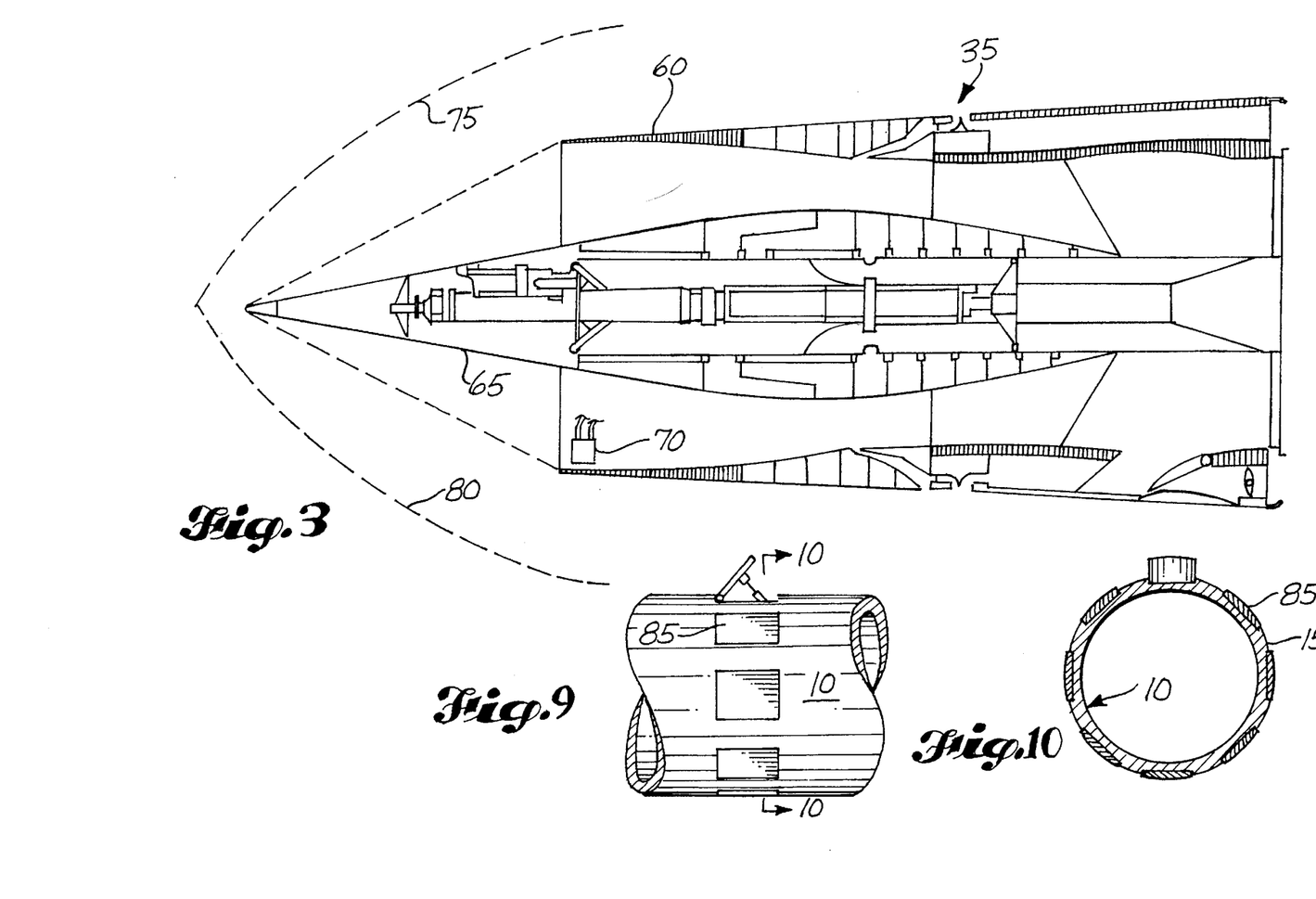
FIG. 3 shows the started and unstarted condition of an engine powering the flight of the airplane of FIG. 1.
FIG. 9 shows another embodiment of the present invention wherein a plurality of body spoilers are distributed around the periphery of the forebody of the airplane of FIG. 1.
FIG. 10 is a view taken along lines 10—10 of FIG. 9 showing one of the body spoilers of FIG. 9 in a deployed state.

A sensor 70 is affixed near the face of the inlet 60 for measuring the pressure of the fluid entering the inlet 60. As long as the inlet 60 is "started", i.e., the contours of the shock 75 formed off the spike 65 coincides with the contours of the face of the inlet 60, the engine 35 operates properly. When the inlet is in an "unstarted" condition, i.e., a shock 80 forms in advance of the spike 65 and does not coincide with the face of the inlet 60, the engine 35 malfunctions resulting in a loss of thrust. An unstarted condition may occur because the air flow into the engine has been perturbed. Air flow perturbations may be caused by, for example, changes in airplane pitch attitude, airplane yaw attitude, changes in air temperature, air turbulence, changes in internal engine pressures, changes in internal engine rotational speed.

As an example, if one or both of the pair of engines 35 malfunction, an undesirable yaw moment is generated about the center of gravity 55. This moment is generated by the unbalanced thrust generated about the center of gravity 55. More particularly, the properly functioning pair of engines 30 generate more thrust than the pair of engines 35 and thus the resultant moments are not equal. Yawing moments are also produced by the pressure fields, caused by the engines, acting on the side facing airplane surfaces aft of the engines such as the side faces of the vertical tail and aft body. As the airplane responds to the unequal resultant moments, the centerline of the airplane (not shown) is no longer aligned with the airplane's flight path. This misalignment, called sideslip or yaw attitude, generates additional moments.

These unbalanced yaw moments must be controlled and counterbalanced appropriately and effectively by available flight controls. Under such conditions, conventionally the vertical tail and rudder 40 and the spoiler slot deflectors 45 and 50 are articulated in an appropriate manner to produce the necessary yaw moment. However, as described above, these flight controls suffer from several disadvantages. As will be better understood hereinafter, the body spoilers of the present invention may reduce the structural, spatial (surface area) requirements associated with a conventionally sized vertical rudder and tail and the volume requirements of conventional spoiler slot deflectors.

When the sensor 70 detects an inlet unstart condition of one or more of a pair of engines, it sends a signal, representative of that condition, to the appropriate body spoiler assembly 85 (see FIGS. 1 and 4) positioned on the same side of the airplane 5 where the engine is malfunctioning. For example, as shown in FIG. 1, if one or more of the engines 35 malfunctions, the sensor 70 sends a deploy signal to the assembly 85 positioned on the starboard side of the forebody 15 of the airplane 5. Deploying the body spoiler assembly 85 results in the creation of a yaw moment which substantially counterbalances the undesirable and sudden yaw moment created as a consequence of one or more malfunctioning engines.

Figures 4, 5:
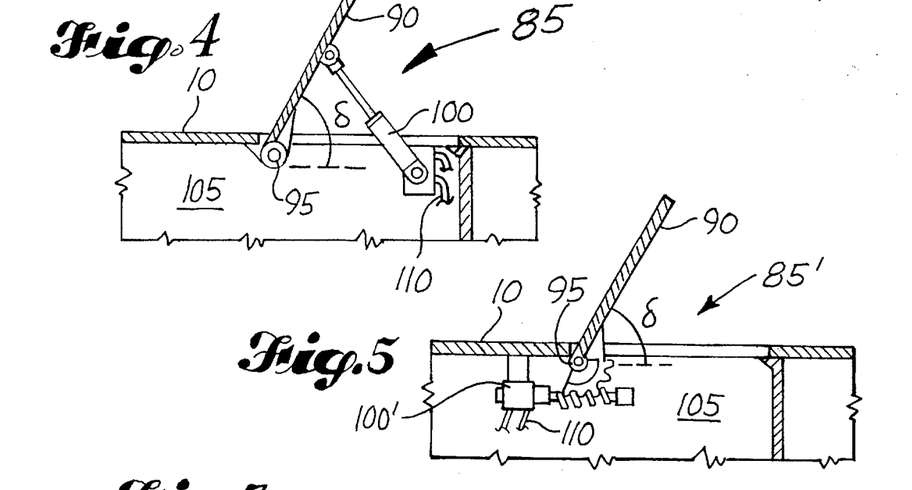
FIG. 4 is a side view of a deployed body spoiler assembly of the present invention and illustrating one type of actuator.
FIG. 5 is a side view of a deployed body spoiler assembly of the present invention and illustrating another type of actuator.

A body spoiler assembly is shown in greater detail in FIG. 4 and comprises a spoiler plate 90 pivotally attached to the fuselage 10 by a pin 95 and a quick response actuator 100 mounted within a cavity 105 in the forebody 15. In a stowed position (not shown in FIG. 4), the spoiler plate 90 conforms to the exterior surface configuration of the fuselage 10. The actuator 100 receives a deploy signal from the sensor 70 via an appropriate means such as electrical leads 110. The actuator 100 is appropriately fixed to the interior structure of the fuselage 10 and has a reciprocable piston rod 115 pivotally attached to the spoiler plate 90. FIG. 5 shows another embodiment of the actuator 100 and is depicted as a rack and pinion actuator 100'.

Figure 6:
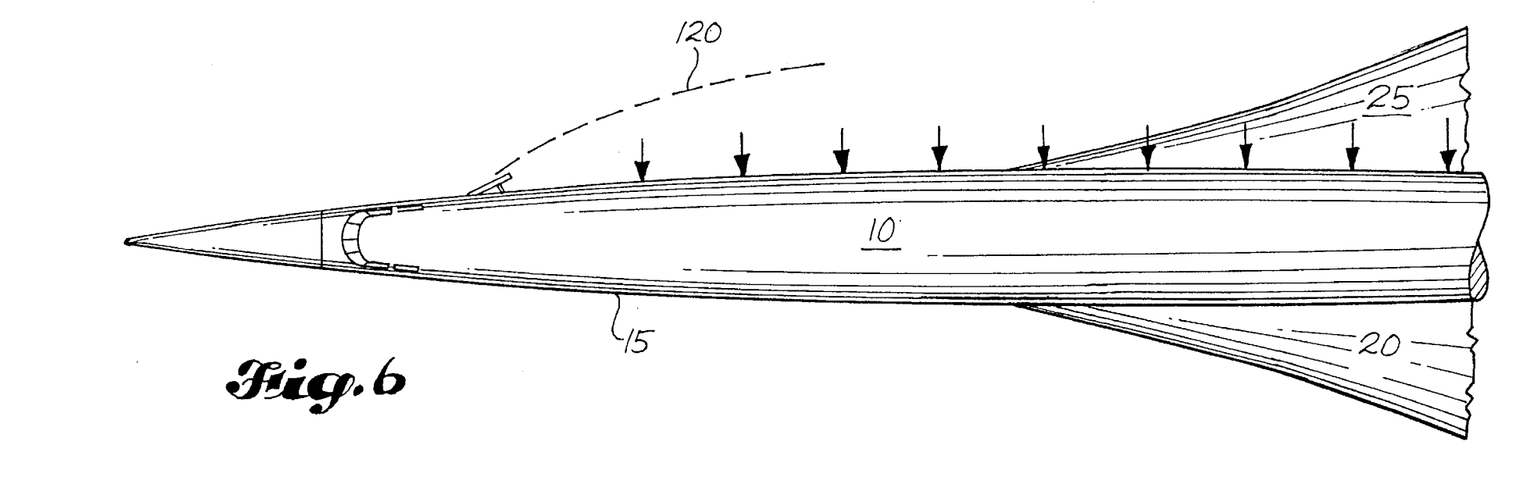
FIG. 6 is a partial plan view of the airplane of FIG. 1 showing a deployed body spoiler, a generalized depiction of a portion of the shock wave formed by the deployed spoiler and a rough approximation of the pressure distribution over the forebody of the airplane.

In use at supersonic speeds, if the actuator receives a deploy signal from the sensor 70 it pivots the spoiler plate through a minimum angle δ into a deployed position best shown in FIGS. 1 and 6. Once deployed, the plate 90 generates a detached shock wave 120 thereby causing the forebody 15 to experience side pressure forces. Those forces generate a yawing moment about the center of gravity 55 which can aid in counterbalancing the undesirable and unexpected yaw moments produced by a malfunctioning engine or pair of engines.

The side area of the forebody 15 can be larger than the side area of the vertical tail and rudder 40. Thus the force that can be produced along the forebody 15 about the center of gravity by the shock 120 can be larger than the side forces produced on the vertical tail and rudder 40 by deflection of the rudder 40. In such cases, the moment arm for the forebody 15 can be greater than that for the vertical tail and rudder 40 because the forebody can be distanced further from the center of gravity 55. Also, there should be little or no elastic losses in use of the body spoiler of the present invention. The pressure loads applied by the shock 120 to the forebody 15 will not significantly deform the forebody and spoiler geometries. Thus, the pressure loads on the forebody 15 do not change.

Figure 7:
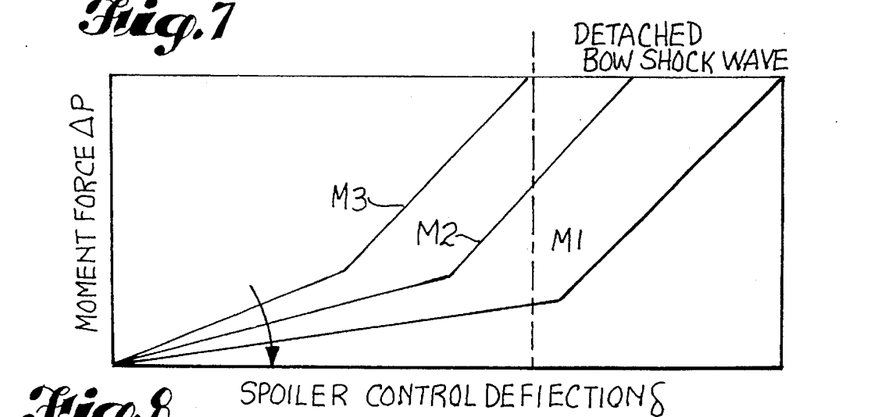
FIG. 7 qualitatively shows the relationship between Mach number and the spoiler deflection angle needed to generate the necessary shock wave and counterbalancing yaw moment.
Figure 8:
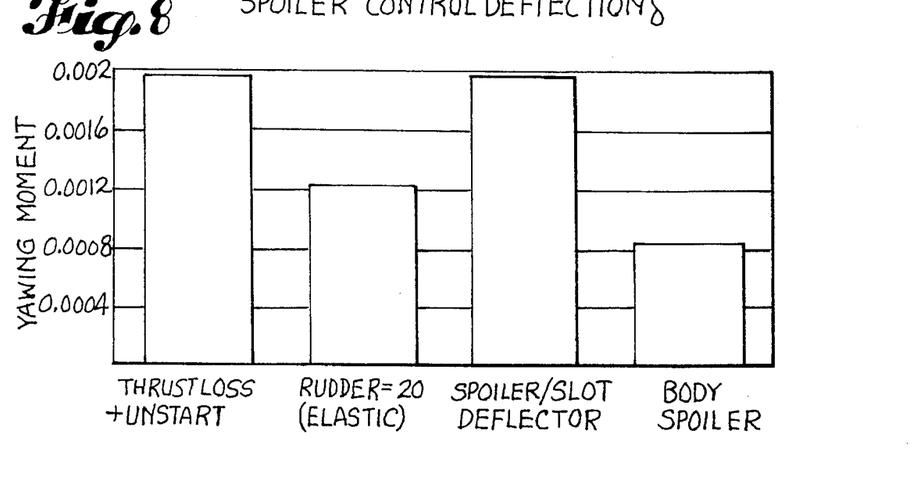
FIG. 8 is a figure depicting preliminary wind tunnel data contrasting the yaw producing effectiveness of the body spoiler of the present invention with conventional flight controls.

The angle of deflection δ of the body spoiler plate 90 is an important aspect of the present invention and can be determined experimentally (see FIG. 7). If the angle of deflection δ is too small, the detached shock wave 120 (see FIG. 6) will not be generated and the necessary pressure/moment forces will not be produced. As qualitatively shown in FIG. 7, the deflection angle δ is dependent upon Mach number M, where M1 is greater than M3. In FIG. 7, the "knee" in each curve M1, M2, M3 represents the point at which a detached shock wave is initiated. As will be understood by those skilled in the art, the greater the Mach number, the smaller the required angle of deflection. For example, where M=1, δ can be 90 degrees. In its most simple embodiment, the actuator 100 receives a deploy signal directly from the pressure sensor 70. In that case, the spoiler plate 90 should always be pivoted a minimum angle wherein δ=90 degrees. However, in a preferred embodiment, the actuator 100 should receive a deploy signal not directly from the sensor 70, but via a controller 125 (see below and FIG. 11) which continuously receives information from an air speed sensor and continuously calculates the deflection angle δ that may be needed if an engine malfunctions. The controller could also select the appropriate body spoiler assembly to use which is of course dependent upon the side of the airplane where the engine is malfunctioning and other flight conditions described below.

Preliminary experimental results with the present invention also indicate that the location of the body spoiler assembly 85 on the forebody 15 (along and around the periphery of the fuselage 10) may also be critical. In particular, this location may be dependent upon the angle of attack and possibly sideslip angle. Thus, the precise location of the assembly 85 must be determined by experimentation and possibly computational fluid dynamics analyses. Ideally, the location of each assembly 85 should be insensitive to these flight conditions. If it is determined that no location is insensitive to these conditions, it may be necessary to locate a plurality of assemblies 85 about the periphery of the fuselage 10 as shown in FIGS. 9 and 10. It should be noted that an assembly 85 has been positioned at the crown and the keel of the fuselage 10. Those assemblies clearly will not produce a significant yaw moment but may be used to produce pitching moment and drag for the purposes of dive recovery. Obviously, a plurality of assemblies 85 may also be disposed about and along the periphery of the forebody 15 if experimentation or analyses indicate the need to do so. If the location is not dependent upon those flight conditions, the location of the assemblies 85 may be as shown in FIG. 1 and only dependent upon airplane configuration but in a location to provide sufficient control. In other words, the distance of each assembly 85 from the center of gravity 55 should be sufficient to generate the necessary yaw moments to counterbalance the yawing moment caused by malfunction of two engines on one side of the airplane 5.

Figure 11:
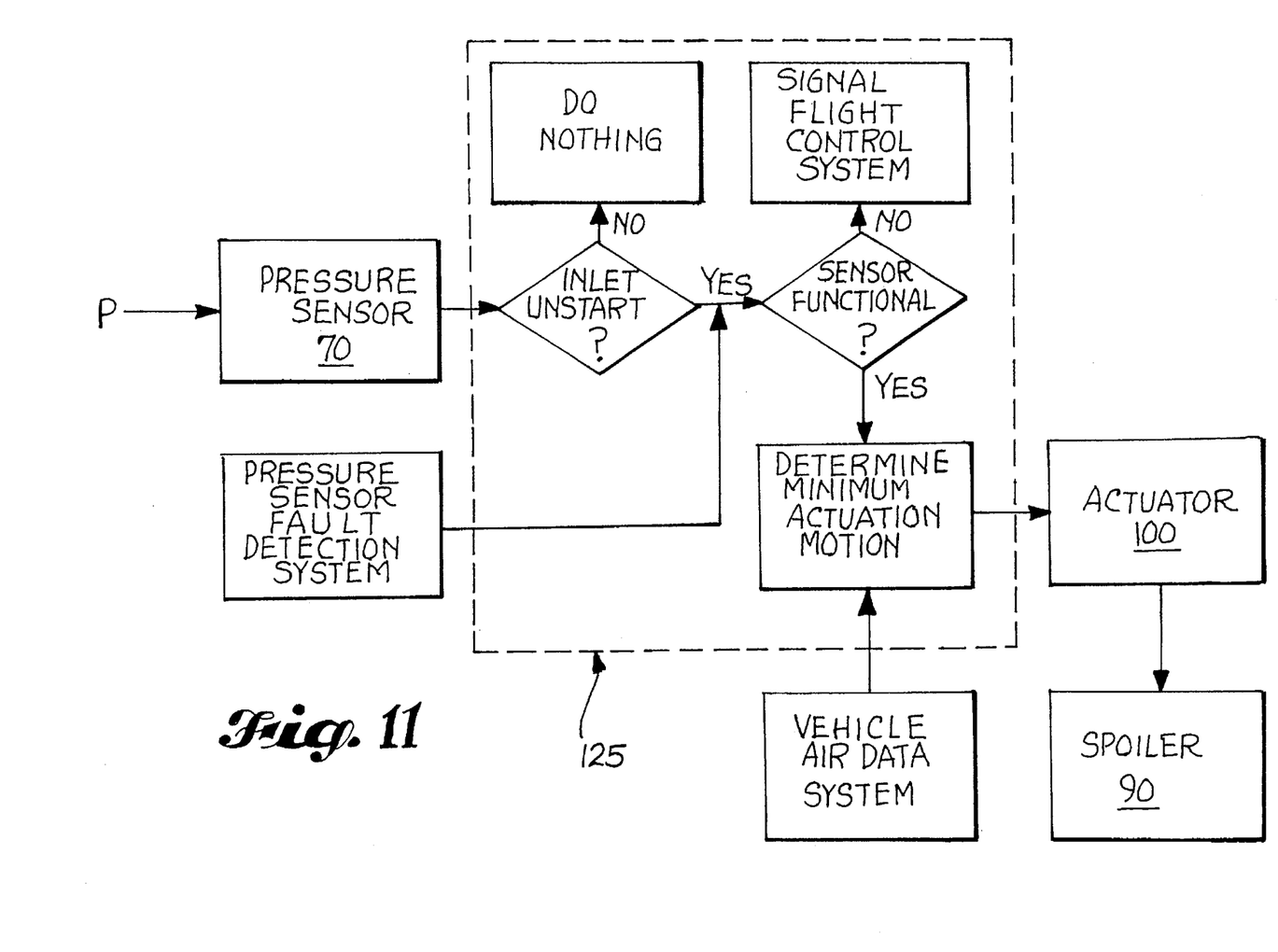
FIG. 11 shows a block diagram of a controller which may be used to transmit a deploy signal to a body spoiler assembly of the present invention.

Turning now to FIG. 11 wherein a simple embodiment of a controller 125 is depicted. In this figure, it is assumed that the location of the body spoiler assemblies 85 are not sensitive to angle of attack or sideslip angle. Thus, a body spoiler assembly 85 is positioned on the forebody 15 on the port and starboard sides of the airplane 5. It is also assumed that only one engine will malfunction in use. It is recognized that modifications to the controller 125 that will be obvious to one of ordinary skill in the art must be made to accommodate multiple engine failures on one side or both sides of the airplane 5. Finally, it is assumed that there is a one to one correspondence between a controller 125 and one of the engines in each pair of engines 30 or 35.

In FIG. 11, pressure P is continuously sensed by pressure sensor 70. The controller 125 receives pressure measurement from the sensor 70 and from that ascertains whether an inlet has unstarted. If it has not, the controller continues monitoring the pressure sensor signal. If an unstart condition is sensed, a pressure sensor fault detection system is queried to determine if the sensor 70 has malfunctioned. If the sensor 70 has malfunctioned, the flight control system is signaled so that appropriate corrective measures may be taken. If the sensor 70 is operable and an unstart condition exists, then the minimum motion of the actuator 100 is calculated to effect the minimum deflection angle δ of the spoiler plate 90. This minimum motion is dependent upon information acquired from the vehicle air data system which includes Mach number. In a practical application, the minimum deflection angle δ of the spoiler plate 90 can be determined experimentally. For example, a table can be generated using the experimental data qualitatively represented in FIG. 7. This data can be correlated to the minimum motion necessary for the actuator 100 to produce the deflection angle δ. Once calculated, the controller 125 sends an appropriate signal to the actuator 100 whereby the spoiler plate 90 may be rotated to produce the necessary detached bow shock 120.

Figure 12:
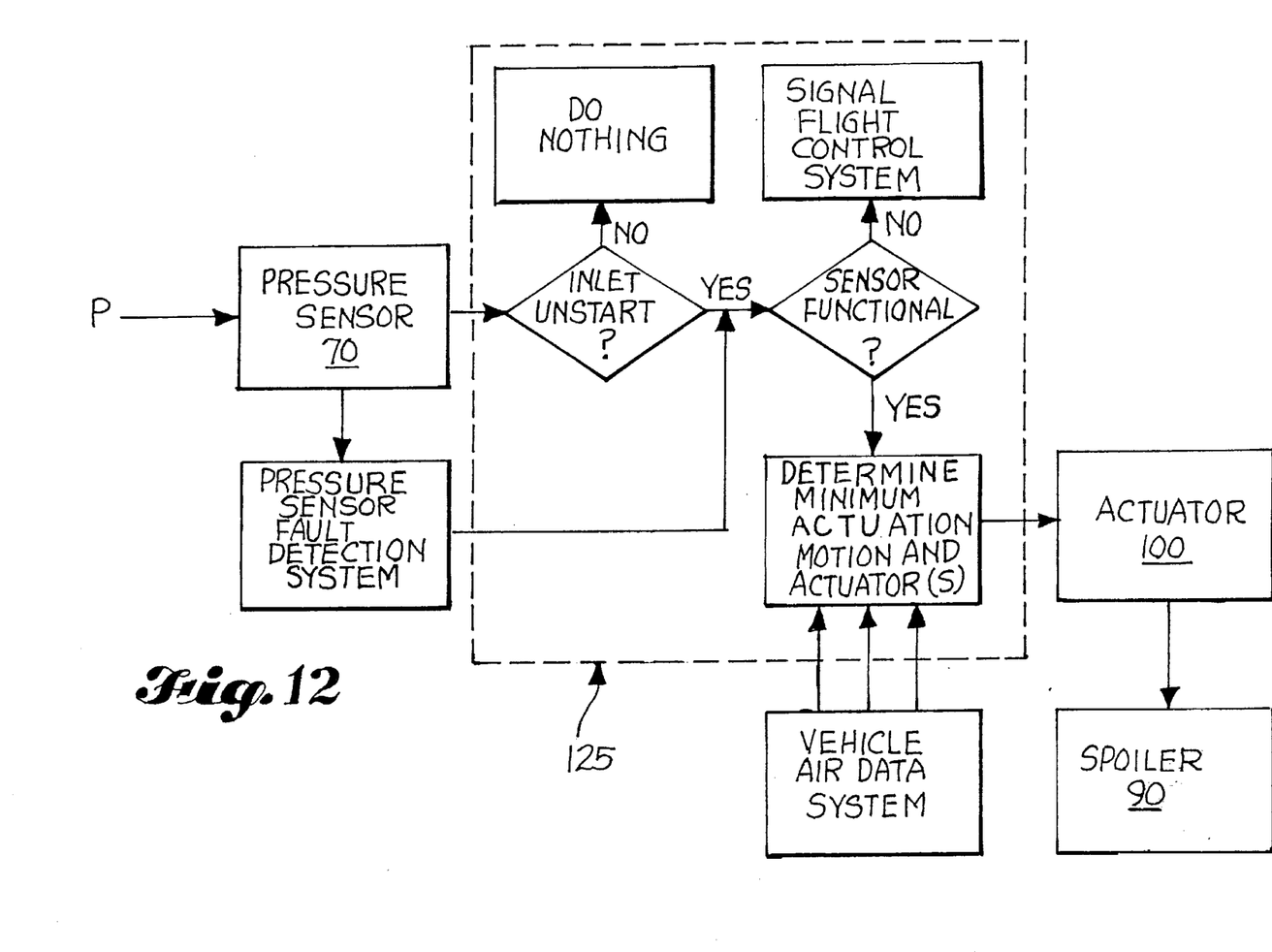
FIG. 12 shows a block diagram of another embodiment of a controller which may be used to transmit a deploy to a selected body spoiler assembly of the present invention.

In FIG. 12, it is assumed that a plurality of body spoiler assemblies 85 is necessary since a single location was not sufficiently insensitive to angle of attack and sideslip angle. As shown in that figure, the vehicle air data system provides the controller 125 with multiple signals representative of Mach number, angle of attack, and sideslip angle. In this case, the controller 125 not only calculates the minimum motion of an actuator 100, but also selects one or more appropriate body spoiler assemblies 85.

While a preferred embodiment of the present invention has been illustrated and described, it should be understood that variations could be made therein without departing from the spirit and scope of the invention. For example, while the instant invention has been described in reference to an air breathing vehicle, it should be obvious to those skilled in the art, that the invention could be applied to rocket propelled vehicles. Accordingly, it is to be understood that the invention is not to be limited to the specific embodiment illustrated and described. Rather the true scope and spirit of the invention is to be determined by reference to the following claims.

The embodiments of the invention in which an exclusive property or privilege is claimed are defined as follows:

1. A method for counteracting the yawing moment generated by a malfunctioning engine powering an air vehicle moving in a fluid at supersonic speeds, said method comprising:

(a) monitoring the pressure of said fluid entering the engine;

(b) sending a signal to an actuator when said pressure reaches a certain value;

(c) said actuator inserting a body spoiler positioned on the forebody of the air vehicle on the same side of said malfunctioning engine into said fluid; thereby:

(d) generating a shock wave proximate said forebody;

(e) producing a change in pressure over said forebody, and (f) generating a yaw moment substantially counteracting the yawing moment generated by said engine.

2. A method for counteracting the yawing moment generated by a malfunctioning engine powering an air vehicle moving in a fluid at supersonic speeds, said method comprising:

(a) monitoring the pressure of said fluid entering the engine;

(b) continuously sending a signal representative of said pressure to a controller;

(c) determining if said pressure signal is representative of a malfunctioning engine;

(d) determining the appropriate deflection angle of a body spoiler positioned on the forebody of the air vehicle on the same side of said malfunctioning engine;

(e) sending a signal representative of said deflection angle to an actuator capable of deflecting said spoiler;

(f) deflecting said spoiler in accordance with said deflection angle, thereby:

(g) generating a shock wave proximate said forebody;

(h) producing a change in pressure over said forebody, and (i) generating a yaw moment substantially counteracting the yawing moment generated by said engine.

3. In an air vehicle powered by engines and being capable of moving within a fluid at supersonic speeds, a system for counterbalancing the yawing moment created by a malfunctioning engine positioned on one side of said vehicle, said system comprising:

(a) a pressure detector located proximate the inlet to said engine, said detector capable of generating a signal when the pressure of the fluid entering said inlet reaches a predetermined value indicating engine malfunction;

(b) at least one spoiler pivotably mounted on the forebody of said vehicle, said spoiler conforming with the configuration of the fuselage of said vehicle and being positioned on the same side of the vehicle as said malfunctioning engine;

(c) an actuator for pivoting said spoiler into said fluid, said actuator being capable of pivoting said spoiler upon receipt of said signal from said detector, whereby when said actuator pivots said spoiler into said fluid a shock wave is generated proximate said forebody and the pressure exerted upon said forebody by said shock wave generates a yawing moment substantially counteracting the yawing moment generated by said malfunctioning engine.

4. The system of claim 3, wherein a plurality of spoilers are pivotably mounted about the periphery of said fuselage.

5. The system of claim 3, wherein a plurality of spoilers are pivotably mounted along the periphery of said fuselage.

6. In an air vehicle powered by engines and being capable of moving within a fluid at supersonic speeds, a system for counterbalancing the yawing moment created by a malfunctioning engine positioned on one side of said vehicle, said system comprising:

(a) a pressure detector located proximate the inlet to said engine, said detector capable of generating a signal when the pressure of the fluid entering said inlet reaches a predetermined value indicating engine malfunction;

(b) a controller for determining the fault condition of said detector and for determining the minimum deflection angle for at least one spoiler pivotably mounted on the forebody of said vehicle, said spoiler conforming with the configuration of the fuselage of said vehicle;

(c) an actuator for pivoting said spoiler into said fluid, said actuator being capable of pivoting said spoiler upon receipt of a signal from said controller, whereby when said actuator pivots said spoiler into said fluid a shock wave is generated proximate said forebody and the pressure exerted upon said forebody by said shock wave generates a yawing moment substantially counteracting the yawing moment generated by said malfunctioning engine.

7. The system of claim 6, wherein a plurality of spoilers are pivotably mounted about the periphery of said fuselage.

8. The system of claim 6, wherein a plurality of spoilers are pivotably mounted along the periphery of said fuselage.

* * * * *